(12) United States Patent
Watson et al.

(10) Patent No.: US 7,352,540 B1
(45) Date of Patent: Apr. 1, 2008

(54) GIANT MAGNETO-RESISTIVE (GMR) TRANSDUCER HAVING SEPARATION STRUCTURE SEPARATING GMR SENSOR FROM HEAD-TAPE INTERFACE

(75) Inventors: Mark Lee Watson, Louisville, CO (US); Francis Campos, Louisville, CO (US); April Lynn Alstrin, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 465 days.

(21) Appl. No.: 11/017,170

(22) Filed: Dec. 20, 2004

(51) Int. Cl.
*G11B 5/39* (2006.01)
*G11B 5/31* (2006.01)

(52) U.S. Cl. ..................................... 360/321
(58) Field of Classification Search ............... 360/321, 360/234.1, 324.1, 120, 122, 125, 126
See application file for complete search history.

(56) References Cited

U.S. PATENT DOCUMENTS

| | | | |
|---|---|---|---|
| 5,013,394 A * | 5/1991 | Rolland et al. | 216/22 |
| 5,617,276 A * | 4/1997 | Takada et al. | 360/321 |
| 5,818,685 A | 10/1998 | Thayamballi et al. | |
| 5,883,763 A | 3/1999 | Yuan et al. | |
| 5,920,446 A | 7/1999 | Gill | |
| 6,219,205 B1 | 4/2001 | Yuan et al. | |
| 6,385,016 B1 | 5/2002 | van Ek et al. | |
| 6,667,862 B2 | 12/2003 | Zhu | |
| 6,680,827 B2 * | 1/2004 | Li et al. | 360/314 |
| 6,680,830 B2 * | 1/2004 | Gill | 360/321 |
| 6,724,583 B2 | 4/2004 | Seigler et al. | |
| 7,170,721 B2 * | 1/2007 | Wu | 360/321 |
| 2002/0181166 A1 * | 12/2002 | Gill | 360/321 |
| 2003/0011944 A1 * | 1/2003 | Hosomi | 360/324.1 |
| 2003/0235015 A1 * | 12/2003 | Wu | 360/321 |
| 2005/0073777 A1 * | 4/2005 | Hasegawa et al. | 360/321 |

* cited by examiner

*Primary Examiner*—Craig A. Renner
*Assistant Examiner*—Matthew G. Kayrish
(74) *Attorney, Agent, or Firm*—Brooks Kushman P.C.

(57) ABSTRACT

A giant magneto-resistive (GMR) transducer for reading data signals magnetically recorded on tape includes a GMR sensor and a separation structure formed on a front edge of the GMR sensor. The GMR sensor reads data signals magnetically recorded on a tape located at a head-tape interface. The separation structure physically separates the GMR sensor from the head-tape interface. The separation structure includes at least one film formed of at least one of non-magnetic and ferromagnetic materials such that the separation structure isolates the GMR sensor from physical contact with the tape at the head-tape interface while maintaining the ability of the GMR sensor to read data signals magnetically recorded on the tape even though the GMR sensor is physically separated from the tape at the head-tape interface. The separation structure may include an under-layer film and an isolation film. The GMR transducer is fabricated by a series of fabrication steps.

2 Claims, 4 Drawing Sheets

GIANT MAGNETO-RESISTIVE (GMR) TRANSDUCER HAVING SEPARATION STRUCTURE SEPARATING GMR SENSOR FROM HEAD-TAPE INTERFACE

BACKGROUND OF THE INVENTION

1. Field of the Invention

The present invention generally relates to giant magneto-resistive (GMR) sensors and, more particularly, to a GMR transducer having a separation structure separating a GMR sensor from a head-tape interface.

2. Background Art

Tape drives are being improved in order to accommodate increased tape cartridge capacities and data rates. Increases in tape cartridge capacities are achievable by increasing the linear data density and the number of data tracks written across the width of tape. Increases in data rates are achievable by increasing the number of parallel data channels and the tape velocity.

Increases in tape cartridge capacities and data rates are limited by the available read back signal-to-noise ratio (SNR). This limitation results because the physical read width in linear flexible media recording systems is proportionally smaller than the physical write width in order to provide the servo system with sufficient margin to correctly position the read sensor within the previously written track during read-back operation. Thus, as the track pitch is reduced, the physical read width is proportionally reduced resulting in a decrease in the read signal and thereby a loss in SNR.

Certain read sensors use the anisotropic magneto-resistance (AMR) effect. The AMR effect causes the intrinsic resistance of an AMR sensor to be a function of the relative angle between the direction of the electric current flow in the sensor and its magnetic moment. The AMR effect has a maximum amplitude of roughly 2.5% of the intrinsic resistance of the sensor. The available signal can be increased somewhat by reducing the thickness of the sensor in order to increase its resistance or by increasing the electric current flow in the sensor. However, the absolute amplitude of the read-back signal is limited by both the maximum current density achievable without damaging the sensor film stack and the temperature rise of the sensor.

These issues can be mitigated by using read-back sensors which use the giant magneto-resistive (GMR) effect. The GMR effect results in sensor resistance changes of more than 10%. However, GMR sensors are formed from extremely thin films (<3 nm) of which several of these films (e.g., Cu, NiMn, PtMn) have significant corrosion issues. As flexible media systems read with the sensor essentially in contact with the surface of the tape this inevitably exposes the sensor to corrosive agents, in addition to abrasion and smearing of the film stack at the sensor edge exposed to the tape. This results in significant processing and reliability issues which currently limit the use of GMR read-back sensors in a tape environment.

SUMMARY OF THE INVENTION

Accordingly, it is an object of the present invention to provide a giant magneto-resistive (GMR) transducer having a separation structure separating a GMR sensor from a head-tape interface and from tape located at the head-tape interface.

It is another object of the present invention to provide a GMR transducer having a separation structure between a GMR sensor and a head-tape interface in order to reduce exposure of the GMR sensor from contact with tape located at the head-tape interface thereby reducing the propensity of the GMR sensor to corrosion, wear, and abrasion damage.

It is a further object of the present invention to provide a GMR transducer having a separation structure formed parallel with and contacting a head-tape interface to isolate a GMR sensor from physical contact with tape at the head-tape interface.

It is still another object of the present invention to provide a GMR transducer having a separation structure formed on a front side of a GMR sensor such that the separation structure contacts tape at a head-tape interface and separates the GMR sensor from the tape at the head-tape interface in which the separation structure is formed from one or more materials that are non-magnetic, ferromagnetic, or a combination of both.

It is still a further object of the present invention to provide a GMR transducer having a separation structure formed on a front side of a GMR sensor to contact a head-tape interface and separate the GMR sensor from the head-tape interface in which the separation structure includes one or more films.

It is still yet another object of the present invention to provide a GMR transducer having a separation structure that separates a GMR sensor from a head-tape interface in which the separation structure includes an isolation film and at least one of an under-layer film and an over-layer film.

It is still yet a further object of the present invention to provide a GMR transducer having a GMR sensor with a separation structure on its front side in which the separation structure is generally parallel to and contacts a head-tape interface, and the GMR transducer further having patterned permanent magnet (PM) films on the GMR sensor sides which are generally normal to the head-tape interface.

In carrying out the above objects and other objects, the present invention provides a giant magneto-resistive (GMR) transducer for reading data signals magnetically recorded on tape. The transducer includes a GMR sensor and a separation structure formed on a front edge of the GMR sensor. The separation structure includes at least one film formed of at least one of non-magnetic and ferromagnetic materials. The separation structure contacts a head-tape interface and separates the GMR sensor from the head-tape interface such that the separation structure isolates the GMR sensor from physical contact with tape located at the head-tape interface while maintaining the ability of the GMR sensor to read data signals magnetically recorded on the tape even though the GMR sensor is physically separated from the tape and the head-tape interface.

The separation structure may be a single isolation film. In this case, the single isolation film may be formed of a non-magnetic material such as Ti, or may be formed of a ferromagnetic material such as CZM (Cobalt Zirconium Molybdenum), NiFeMo, and NiFeCr. Of course, other non-magnetic and ferromagnetic materials may be used to form the single isolation film of the separation structure. For example, in addition to Ti, any hard wearing, high resistivity, corrosion resistant, non-magnetic material may be used to form the single isolation film of the separation structure. Likewise, in addition to CZM, NiFeMo, and NiFeCr, any magnetically soft ferromagnetic material which improves the coupling of magnetic flux from magnetic transitions recorded in tape located at the head-tape interface into the GMR sensor may be used to form the single isolation film of the separation structure.

Alternatively, the separation structure may include an under-layer film and an isolation film. In this case, the under-layer film is formed on the front edge of the GMR sensor and the isolation film is formed on the under-layer film such that the under-layer film physically isolates the isolation film from the GMR sensor. The entire under-layer film may be formed offset from the head-tape interface, or a portion of the under-layer film may abut the head-tape interface. The under-layer film may be formed of a material such as Cr and Ta, and the isolation film may be formed of a ferromagnetic material such as CZM, NiFeMo, and NiFeCr for conducting magnetic flux from the tape at the head-tape interface into the GMR sensor. The separation structure may further include an over-layer film.

Again, other materials may be used to form the under-layer film and other ferromagnetic materials may be used to form the isolation film. For example, in addition to Cr and Ta, any material which does not propagate anti-ferromagnetic coupling between the magnetic films of the GMR sensor and which can be deposited with a high resistivity may be used to form the under-layer film. Likewise, in addition to CZM, NiFeMo, and NiFeCr, any magnetically soft ferromagnetic material which improves the coupling of magnetic flux from magnetic transitions recorded in tape located at the head-tape interface into the GMR sensor may be used to form the isolation film.

First and second patterned permanent magnetic (PM) films may be disposed adjacent to respective first and second side edges of the GMR sensor, first and second side edges of the separation structure, and the head-tape interface.

Further, in carrying out the above objects and other objects, the present invention provides another transducer. This transducer includes a GMR sensor and a separation structure formed on a front edge of the GMR sensor. The separation structure physically separates the GMR sensor from a head-tape interface. The separation structure includes an under-layer film and an isolation film. The under-layer film prevents propagation of anti-ferromagnetic or ferromagnetic coupling between magnetic layers of the GMR sensor and the isolation film conducts magnetic flux from tape at the head-tape interface to the GMR sensor such that the separation structure isolates the GMR sensor from physical contact with the tape located at the head-tape interface while enabling the GMR sensor to read data signals magnetically recorded on the tape even though the GMR sensor is physically separated from the tape at the head-tape interface.

Also, in carrying out the above objects and other objects, the present invention provides a method of forming a GMR transducer having a separation structure separating a GMR sensor from a head-tape interface. The method includes depositing a GMR sensor sheet film over a wafer; protecting a portion of the GMR sensor sheet film with photo-resist; and etching away an unprotected portion of the GMR sensor sheet film to thereby leave GMR sensor material on the wafer.

A separation structure sheet film is then deposited over the GMR sensor material and the wafer. The photo-resist is then lifted off to remove the separation structure sheet film deposited over the GMR sensor material to thereby leave the GMR sensor material surrounded by separation structure material on the wafer. A portion of the GMR sensor material which is to form a GMR sensor is protected with photo-resist and a portion of the separation structure material which is to form a separation structure on an edge of the GMR sensor is also protected with photo-resist. The unprotected portions of the GMR sensor material and the separation structure material are then milled away to thereby leave the GMR sensor and the separation structure on the wafer with the separation structure being formed on an edge of the GMR sensor. The separation structure is then lapped to define a head-tape interface with the separation structure being disposed between the edge of the GMR sensor and the head-tape interface such that the separation structure physically separates the GMR sensor from the head-tape interface.

The method may further include, prior to the step of lapping, depositing a permanent magnet (PM) stabilization sheet film over the GMR sensor, the separation structure, and the wafer. The photo-resist is then lifted off to remove the PM sheet film deposited over the GMR sensor and the separation structure to thereby leave left and right patterned PM films abutting left and right sides of the GMR sensor.

The advantages accruing to the present invention are numerous. For example, future tape drives will require a significant increase in cartridge capacity which will necessitate a large increase in the read-back signal per unit track-width. Such an increase can be obtained using GMR sensors if the severe technological difficulties inherent in introducing GMR heads into a production tape environment can be solved. The present invention solves these technological difficulties. Without the use of the present invention, a hard upper limit to the ultimate capacity of flexible media based linear recording systems is effectively set by the limitations of AMR sensors. In sum, the present invention provides the ability to circumvent the corrosion and wear limitations of introducing GMR sensors into linear tape systems.

DETAILED DESCRIPTION OF THE PREFERRED EMBODIMENT(S)

Figure 1:
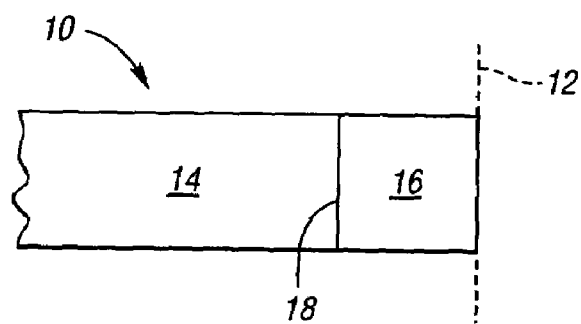
FIG. 1 illustrates a cross-sectional view of a giant magneto-resistive (GMR) transducer in accordance with an embodiment of the present invention.

Referring now to FIG. 1, a cross-sectional view of a giant magneto-resistive (GMR) transducer 10 in accordance with an embodiment of the present invention is shown. GMR transducer 10 is to be employed in a magnetic head for reading magnetically recorded data from a magnetic medium such as tape. To this end, GMR transducer 10 includes a head-tape interface 12 (i.e., a tape bearing surface) which is to be positioned adjacent to tape for the GMR transducer to read data from the tape.

GMR transducer 10 generally includes a GMR sensor 14 and a separation structure 16. As is known in the art, GMR sensor 14 is formed by a set of layers which form a film stack. Such layers forming the film stack of GMR sensor 14 typically include free and pinned NiFe layers. Separation structure 16 is formed on a front side or edge 18 of GMR sensor 14 and physically separates the GMR sensor from head-tape interface 12. That is, separation structure 16 is interposed between GMR sensor 14 and head-tape interface 12 such that the GMR sensor is offset from the head-tape interface. As such, separation structure 16 reduces exposure of GMR sensor 14 to direct physical contact with the surface of tape at head-tape interface 12 when GMR transducer 10 is reading data from the tape.

Separation structure 16 is formed of materials that are non-magnetic, ferromagnetic, or a combination of both. Separation structure 16 includes one or several films. The material(s) and film(s) defining separation structure 16 are selected such that the separation structure protects GMR sensor 14 and its front surface 18 from the tape surface at head-tape interface 12 while not degrading the performance of the GMR sensor. From the proper selection of the material(s) and film(s) used to define separation structure 16, coupling of the free and pinned layers in the film stack of GMR sensor 14 can be minimized while coupling of written transitions from tape at head-tape interface 12 into the GMR sensor can be maximized.

In general, separation structure 16 protects GMR sensor 14 by physically isolating the GMR sensor from head-tape interface 12 in order to reduce exposure of the GMR sensor from direct physical contact with tape located at the head-tape interface thereby reducing the propensity of the GMR sensor to corrosion, wear, and abrasion damage while enabling the GMR sensor to read data from the tape. That is, separation structure 16 is designed to not degrade the read performance of GMR sensor 14 while it protects the GMR sensor.

In the embodiment shown in FIG. 1, separation structure 16 is shown as being a single layer of material. In this case, separation structure 16 may be a single film formed of a non-magnetic, but very hard wearing, high resistivity, corrosion resistant material (such as Ti) to separate front edge 18 of GMR sensor 14 from head-tape interface 12. Such non-magnetic materials are suitable to define separation structure 16 when the separation structure is formed of a single, non-magnetic film.

Alternatively, separation structure 16 may be a single film formed of a ferromagnetic material to separate front edge 18 of GMR sensor 14 from head-tape interface 12. In this case, for example, separation structure 16 may be formed from a magnetically soft ferromagnetic material such as CZM, NiFeMo, and NiFeCr which improves the coupling of the magnetic flux from the transitions recorded on tape into GMR sensor 14. When formed of a ferromagnetic material such as CZM, NiFeMo, and NiFeCr, separation structure 16 functions to conduct magnetic flux from the magnetic transitions recorded on tape located at head-tape interface 12 into GMR sensor 14.

Regardless of whether the single film forming separation structure 16 is a non-magnetic or a magnetic material, the separation structure functions as an "isolation film" as it isolates GMR sensor 14 from direct physical contact and exposure to head-tape interface 12.

Figure 2:
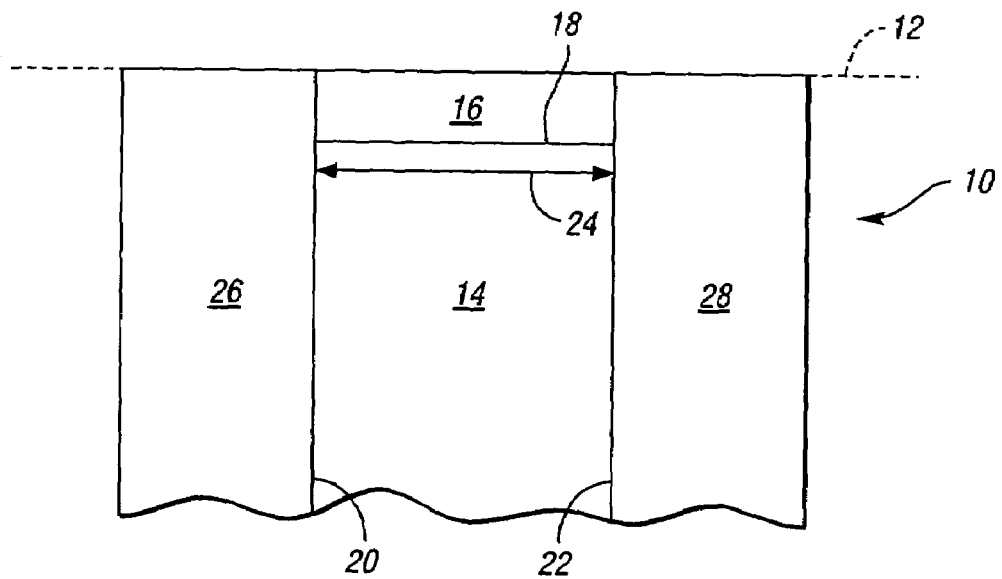
FIG. 2 illustrates a top-down view of the GMR transducer shown in FIG. 1.

Referring now to FIG. 2, with continual reference to FIG. 1, a top-down view of GMR transducer 10 is shown. As shown in FIG. 2, GMR sensor 14 and separation structure 16 share two side surfaces 20 and 22 which are generally normal to head-tape interface 12. Front side 18 of GMR sensor 14 has a width 24 between side surfaces 20 and 22. Width 24 defines the physical read width of GMR sensor 14. Separation structure 16 also has the same width 24 as GMR sensor 14 and is generally formed parallel with head-tape interface 12 between side surfaces 20 and 22.

GMR transducer 10 further includes a pair of permanent magnet (PM) films 26 and 28. PM film 26 is defined to abut GMR sensor 14 and separation structure 16 along side surface 20. PM film 26 is further defined to abut and be formed parallel with head-tape interface 12 as shown in FIG. 2. Likewise, PM film 28 is defined to abut GMR sensor 14 and separation structure 16 along side surface 22. PM film 28 is also defined to abut and be formed parallel with head-tape interface 12 as shown in FIG. 2. PM films 26 and 28 are patterned PM stabilization films which function to stabilize the performance of GMR sensor 14 for reading magnetically recorded data from tape.

Figure 3:
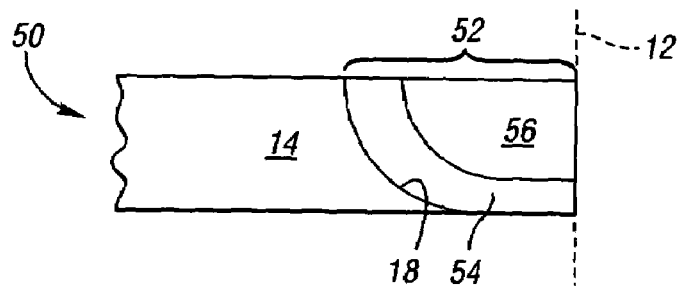
FIG. 3 illustrates a cross-sectional view of a GMR transducer in accordance with another embodiment of the present invention.
Figure 4:
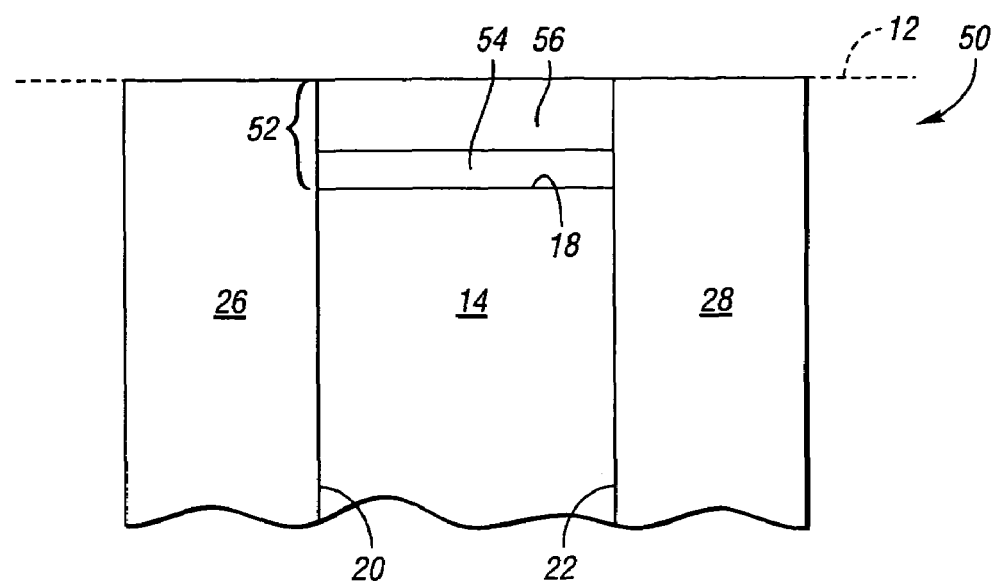
FIG. 4 illustrates a top-down view of the GMR transducer shown in FIG. 3.

Referring now to FIGS. 3 and 4, cross-sectional and top-down views of a GMR transducer 50 in accordance with another embodiment of the present invention are respectively shown. GMR transducer 50 includes a separation structure 52 which separates front edge 18 of GMR sensor 14 from head-tape interface 12. Separation structure 52 generally differs from separation structure 16 of GMR transducer 10 shown in FIG. 1 in that separation structure 52 is defined from two films 54, 56 instead of just a single film. More particularly, separation structure 52 includes an under-layer film 54 and an isolation film 56.

Under-layer film 54 is interposed between front edge 18 of GMR sensor 14 and isolation film 56. Under-layer film 54 is defined such that a portion of the under-layer film abuts side surface 22 and head-tape interface 12 as shown in FIG. 3. Under-layer film 54 physically isolates isolation film 56 from direct contact with GMR sensor 14. Isolation film 56 is interposed between head-tape interface 12 and under-layer film 54. Isolation film 56 serves to separate GMR sensor 14 and its front edge 18 from head-tape interface 12.

As an example, under-layer film 54 is formed of Cr or Ta as these materials neither propagate anti-ferromagnetic coupling between the NiFe layers (which make up the film stack of GMR sensor 14) and can both be deposited with high resistivity. In either case, isolation film 56 is formed from a magnetically soft ferromagnetic material such as CZM, NiFeMo, or NiFeCr in order to improve the coupling of the magnetic flux from the transitions recorded on the tape into GMR sensor 14. As such, isolation film 56 functions to conduct magnetic flux into GMR sensor 14 from magnetic transitions recorded in tape at head-tape interface 12. The role of under-layer film 54 is not to separate front edge 18 of GMR sensor 14 from head-tape interface 12 but it is rather to ensure the correct operation of the GMR sensor.

Figure 5:
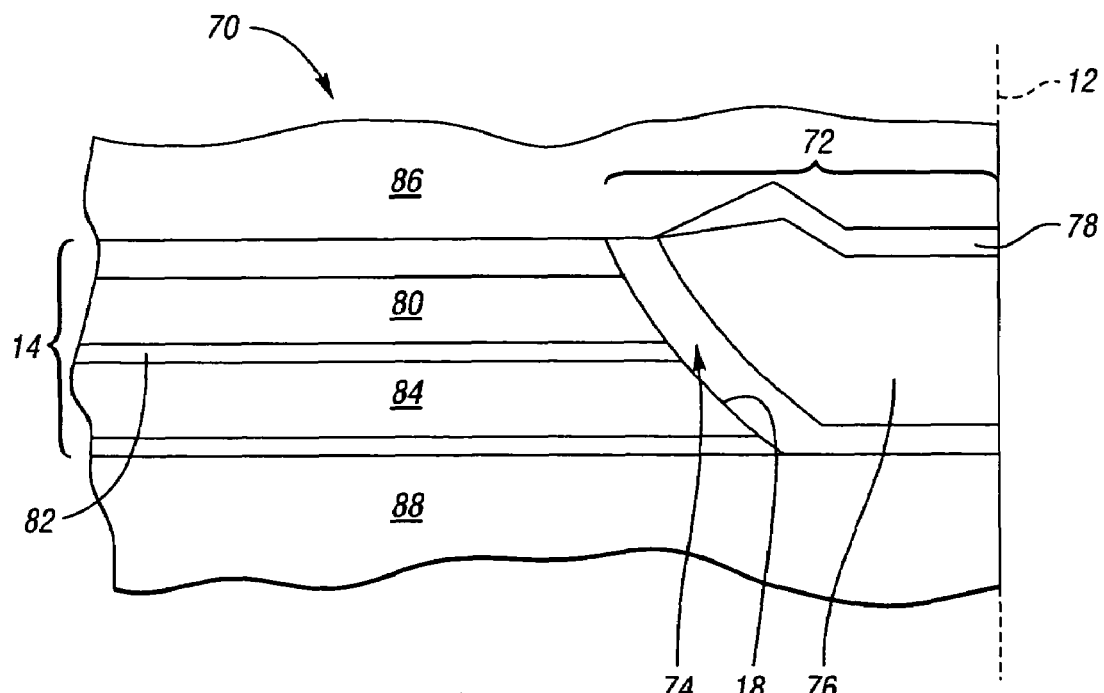
FIG. 5 illustrates a cross-sectional view of a GMR transducer in accordance with another embodiment of the present invention.

Referring now to FIG. 5, a cross-sectional view of a GMR transducer 70 in accordance with another embodiment of the present invention is shown. GMR transducer 70 includes a separation structure 72 which separates front edge 18 of GMR sensor 14 from head-tape interface 12. Separation structure 72 includes an under-layer film 74, an isolation film 76, and an over-layer film 78. Just like the role of under-layer film 74, the role of over-layer film 78 is not to separate GMR sensor 14 from head-tape interface 12 but to ensure the correct operation of the GMR sensor in conjunction with the under-layer film and isolation film 76.

As an example, some of the individual layers of the film stack forming GMR sensor 14 are shown in FIG. 5. These exemplary layers of GMR sensor 14 include a free NiFe layer 80, a Cu inter-layer film 82, and a pinned NiFe layer 84. GMR transducer 70 further includes insulating layers 86, 88 which respectively bound the top and bottom sides of GMR transducer 70 as shown in FIG. 5.

Referring now to FIGS. 6 through 11, a fabrication process for forming a GMR transducer having a separation structure separating a GMR sensor from a head-tape interface in accordance with the present invention is shown. The views shown in FIGS. 6 through 11 are looking down at a top side of the GMR transducer being fabricated. As such, the views shown in FIGS. 6 through 11 are top-down views like the top-down GMR transducer views shown in FIGS. 2 and 4.

It is to be understood that each of FIGS. 6 through 11 may actually cover more than one actual fabrication step. For example, to proceed from FIG. 6 (GMR sensor deposited as sheet film) to FIG. 7 (GMR sensor pattern) photo definition and ion mill (or etch) steps are involved. A separation structure would then be deposited (FIG. 8) in situ before any resist strip/lift off step. As such, the sequence of the fabrication process illustrated in FIGS. 6 through 11 is to be understood to include additional typical fabrication steps which are evident to those skilled in the art.

Figure 6:
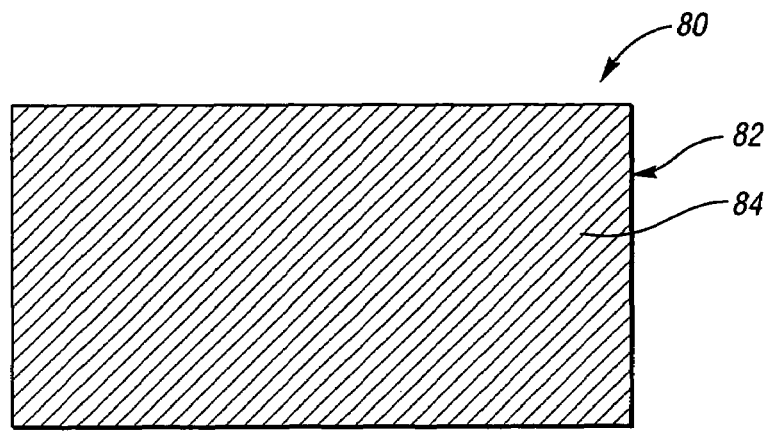
FIGS. 6 through 11 illustrate a fabrication process for forming a GMR transducer having a separation structure separating a GMR sensor from a head-tape interface in accordance with the present invention.

A first fabrication step 80 shown in FIG. 6 includes depositing a GMR sensor sheet film 82 on a wafer having a base structure 84. As is known in the art, base structure 84 for a GMR sensor typically includes the following sequence of layers from the bottom to the top: (AlTiC) substrate, insulating under-layer, patterned magnetic shield, and an insulating gap. GMR sensor sheet film 82 is deposited over the insulating gap layer of base structure 84. GMR sensor sheet film 82 includes the film stack which forms the GMR sensor.

Figure 7:
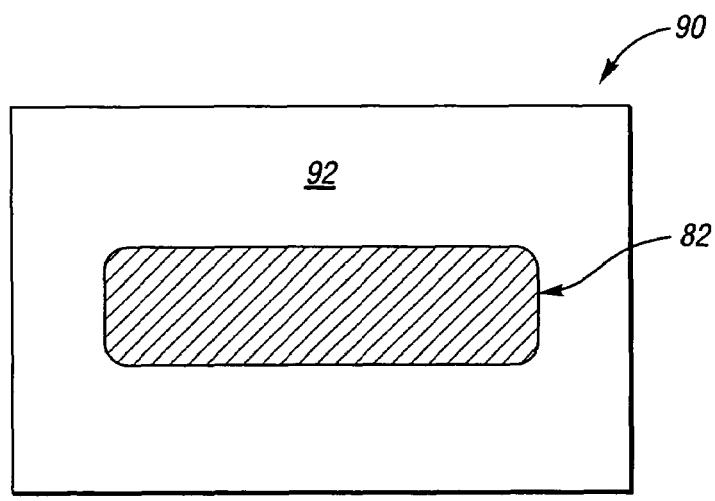

A second fabrication step 90 shown in FIG. 7 includes defining the GMR sensor from the deposited GMR sensor sheet film 82. Second fabrication step 90 is performed by defining the desired shape of the GMR sensor with photo-resist through photolithography. The unprotected portion 92 of film stack 82 is then milled away leaving a desired portion of the GMR sensor film stack 82 as shown in FIG. 7.

Figure 8:
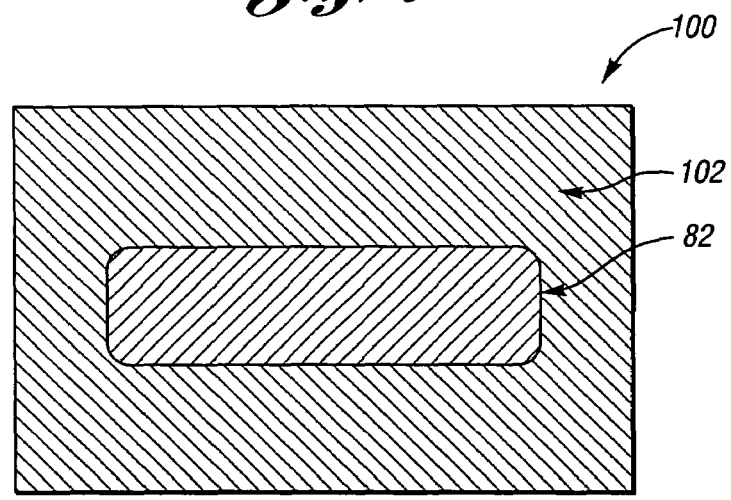

A third fabrication step 100 shown in FIG. 8 includes defining an abutted junction (i.e., a separation structure) with separation structure material 102 around the remaining desired portion of GMR sensor film stack 82. With the photo-resist remaining on GMR sensor film stack 82 from the second fabrication step 90, the separation structure material 102 is deposited as a sheet film over the remaining GMR sensor film stack 82 and the milled away portion 92. As will be described below, separation structure material 102 forms a separation structure such as separation structures 16, 52, and 72. For example, to form separation structure 16, separation structure material 102 includes one deposition of a film layer which forms separation structure 16. As another example, to form separation structure 52, separation structure material 102 includes several depositions of film layers which form under-layer film 54 and isolation film 56 of separation structure 52. After the separation structure material 102 is deposited, the photo-resist is lifted off leaving the desired portion of GMR sensor 82 surrounded by separation structure material 102 as shown in FIG. 8.

Figure 9:
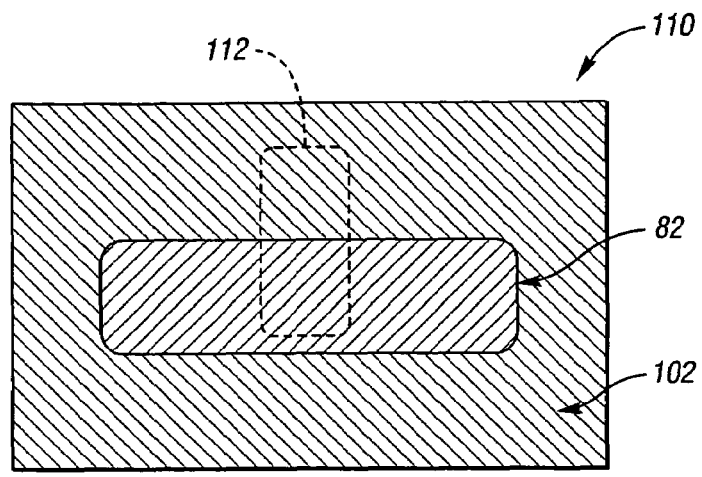
Figure 10:
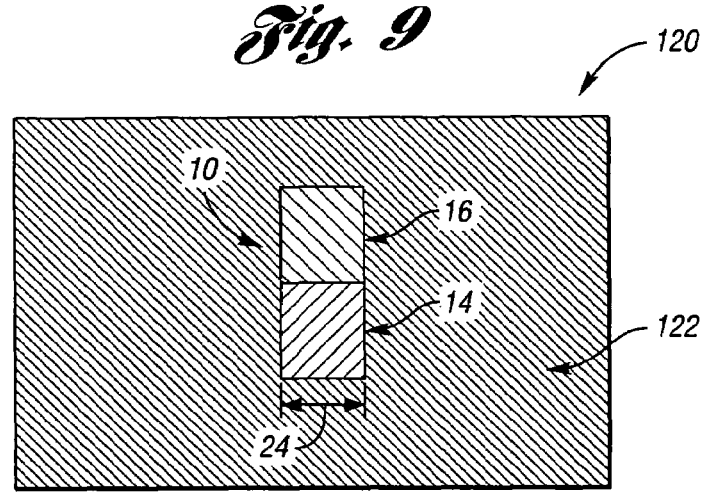

A fourth fabrication step 110 shown in FIG. 9 includes photo-defining a desired portion of GMR sensor film stack 82 and separation structure material 102 as indicated by dashed line 112. The remaining portion of GMR sensor film stack 82 and isolation junction material 102 are then milled away leaving GMR sensor 14 and a separation structure such as separation structure 16 as shown in FIG. 10. As shown in FIG. 10, GMR sensor 14 has width 24 which defines the physical read width of the GMR sensor.

A fifth fabrication step 120 shown in FIG. 10 includes depositing a permanent magnet (PM) stabilization sheet film 122 on base substrate 84 and over the photo-resist still protecting GMR sensor 14 and separation structure 16. PM stabilization sheet film 122 forms abutted junctions with GMR sensor 14 and separation structure 16. After the photo-resist is lifted off, a GMR transducer 10 remains as illustrated in FIG. 10.

Figure 11:
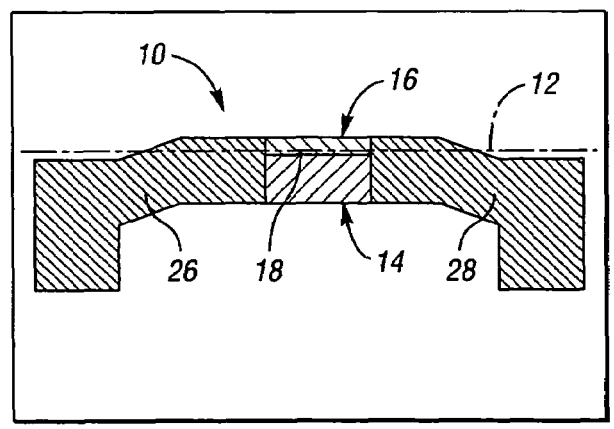

A sixth fabrication step 130 shown in FIG. 11 includes photo-defining and milling away unprotected portions of the GMR sensor film stack, the separation structure material, and PM stabilization sheet film 122 to define GMR sensor 14, separation structure 16, and patterned PM films 26, 28 prior to completion of the reader wafer build and lapping. The dashed line indicates the finished stripe height of GMR sensor 14 after lapping which is set to be head-tape interface 12. As such, head-tape interface 12 is located within separation structure 16 and the distance from head-tape interface 12 to GMR sensor 14 is minimized with sensing front edge 18 of the GMR sensor not being in contact with the head-tape interface.

Thus, it is apparent that there has been provided, in accordance with the present invention, a GMR transducer having a separation structure separating a GMR sensor from a head-tape interface, and method of making same that fully satisfy the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A giant magneto-resistive (GMR) transducer for reading data signals magnetically recorded on tape, the transducer comprising:
   a GMR sensor having a front edge; and
   a separation structure formed of Titanium (Ti), the separation structure formed on the front edge of the GMR sensor to contact tape at a head-tape interface and separate the GMR sensor from the head-tape interface such that the separation structure isolates the GMR sensor from contact with the tape located at the head-tape interface while enabling the GMR sensor to read data signals magnetically recorded on the tape even though the GMR sensor is separated from the tape and the head-tape interface.

2. The transducer of claim 1 further comprising:
   first and second patterned permanent magnetic (PM) films disposed adjacent to respective first and second side edges of the GMR sensor, first and second side edges of the separation structure, and the head-tape interface.

* * * * *